(12) United States Patent
Reiner

(10) Patent No.: US 10,130,213 B2
(45) Date of Patent: Nov. 20, 2018

(54) COOKING SPLATTER PROTECTION DEVICE

(71) Applicant: Gowanus Kitchen Lab, LLC, Brooklyn, NY (US)

(72) Inventor: Yair Reiner, Brooklyn, NY (US)

(73) Assignee: GOWANUS KITCHEN LAB, LLC, Brooklyn, NY (US)

( * ) Notice: Subject to any disclaimer, the term of this patent is extended or adjusted under 35 U.S.C. 154(b) by 299 days.

(21) Appl. No.: 15/012,171

(22) Filed: Feb. 1, 2016

(65) Prior Publication Data

US 2016/0374512 A1 Dec. 29, 2016

Related U.S. Application Data

(60) Provisional application No. 62/184,950, filed on Jun. 26, 2015.

(51) Int. Cl.
*A47J 36/06* (2006.01)
*F16B 45/00* (2006.01)
*A47J 37/10* (2006.01)

(52) U.S. Cl.
CPC .................... *A47J 37/108* (2013.01)

(58) Field of Classification Search
USPC ......... 99/339, 340, 348, 357, 413, 422, 645; 126/9 R, 92 B, 41 R, 381.1, 24, 25 R, 29
See application file for complete search history.

(56) References Cited

U.S. PATENT DOCUMENTS

| 616,573 | A | * | 12/1898 | Hertz | A47J 36/20 99/403 |
| 656,855 | A | * | 8/1900 | Pimlott | B65D 41/22 126/299 C |
| 934,991 | A | * | 9/1909 | Buehl | A47J 36/06 126/381.1 |
| 1,682,095 | A | | 8/1928 | Reyther | |
| 2,148,181 | A | * | 2/1939 | Andreolo | A47J 37/101 126/299 C |
| 2,488,215 | A | | 11/1949 | Mayne | |
| 2,611,510 | A | * | 9/1952 | Willits | A47J 37/101 126/299 C |
| 2,614,718 | A | | 10/1952 | Loop | |
| 2,680,532 | A | * | 6/1954 | Mitchell | A47J 36/06 126/299 C |
| 2,842,116 | A | * | 7/1958 | Hinderer | A47J 37/0763 126/25 R |
| 2,999,559 | A | * | 9/1961 | Boyer | A47J 37/101 126/383.1 |

(Continued)

FOREIGN PATENT DOCUMENTS

EP 1031308 A1 8/2000

*Primary Examiner* — Steven B McCallister
*Assistant Examiner* — Desmond C Peyton
(74) *Attorney, Agent, or Firm* — Andrew F. Young, Esq.; Lackenbach Siegel, LLP (57) ABSTRACT

A cooking splatter guard is provided that includes a surface extending up from a top edge of a cooking implement at an angle. The angle formed between a plane defined by a top edge of the cooking implement and the surface is greater than 90 degrees. The surface forms a friction fit with the top edge of the cooking implement. A lip of the cooking implement formed by the top edge the cooking implement is a same size or slightly smaller than a bottom edge of the cooking splatter guard.

12 Claims, 7 Drawing Sheets

(56) References Cited

U.S. PATENT DOCUMENTS

| | | | | |
|---|---|---|---|---|
| 3,240,172 | A * | 3/1966 | Romberg | 126/25 B |
| 3,327,698 | A * | 6/1967 | Leslie | A47J 37/07 126/25 R |
| 3,561,422 | A * | 2/1971 | Colin-Smith | F24C 1/16 126/92 B |
| 3,585,050 | A * | 6/1971 | Singer | A47J 37/1204 220/367.1 |
| 3,688,758 | A * | 9/1972 | Stephen, Jr. | A47J 37/0713 126/25 A |
| 3,765,397 | A * | 10/1973 | Henderson | A47J 37/0763 126/25 B |
| 3,915,145 | A * | 10/1975 | Tomita | A47J 37/0763 126/25 A |
| 4,014,315 | A * | 3/1977 | Lagunilla | A47J 36/36 126/275 R |
| 4,422,441 | A * | 12/1983 | Schoepe | F24C 15/12 126/299 C |
| 4,430,985 | A * | 2/1984 | Huneycutt | F24B 1/202 126/15 R |
| 4,446,854 | A * | 5/1984 | Clevett | F24J 2/02 126/682 |
| 4,452,225 | A * | 6/1984 | Plant | F24C 1/10 126/213 |
| 4,467,784 | A * | 8/1984 | Lee | A47J 27/58 126/384.1 |
| 4,587,947 | A * | 5/1986 | Tomita | A47J 37/0763 126/25 R |
| 4,590,919 | A * | 5/1986 | Spani | A47J 37/101 126/381.1 |
| 4,653,462 | A * | 3/1987 | DeFoe | F24C 15/36 126/24 |
| 4,714,013 | A * | 12/1987 | Telfer | F24C 1/16 126/9 R |
| 4,722,322 | A * | 2/1988 | Varney | F24C 1/16 126/15 R |
| 4,829,975 | A * | 5/1989 | Hait | A47J 37/0763 126/152 B |
| 4,896,650 | A * | 1/1990 | Hait | A47J 37/0763 126/152 B |
| 4,938,202 | A * | 7/1990 | Hait | F24C 1/16 126/38 |
| 5,241,900 | A * | 9/1993 | Piane, Sr. | A47J 37/01 126/373.1 |
| 5,425,352 | A * | 6/1995 | Gillam | A47J 37/0763 126/25 R |
| 5,481,967 | A * | 1/1996 | Chen | A47J 37/101 126/299 C |
| 5,495,845 | A * | 3/1996 | Hait | F24C 3/14 126/25 R |
| D368,827 | S * | 4/1996 | Thomas | D7/354 |
| 5,529,053 | A * | 6/1996 | Carter | A47J 37/0704 126/25 R |
| 5,542,347 | A * | 8/1996 | Joseph | A47J 36/36 126/299 C |
| 5,655,435 | A * | 8/1997 | Rachesky | A47J 37/0704 126/25 R |
| 5,687,704 | A * | 11/1997 | Lerch | A47J 37/0763 126/25 R |
| 5,724,885 | A * | 3/1998 | Uy | A47J 37/101 126/299 C |
| 5,794,524 | A * | 8/1998 | Kemker | A47J 27/04 126/369 |
| 5,797,386 | A * | 8/1998 | Orr | A47J 37/0704 126/25 A |
| 6,029,652 | A * | 2/2000 | Riedl | A47J 37/101 126/218 |
| 6,056,146 | A * | 5/2000 | Varakian | A47J 37/108 126/299 C |
| 6,698,336 | B1 * | 3/2004 | Siegel | A21B 3/137 220/573.1 |
| 6,866,035 | B2 * | 3/2005 | Haemerle | F24C 15/12 126/214 D |
| 6,880,546 | B1 * | 4/2005 | Koncelik, Jr. | A47J 37/0786 126/242 |
| 6,918,387 | B2 * | 7/2005 | Klarich | F24C 15/36 126/201 |
| 7,073,498 | B2 * | 7/2006 | Howell | A47J 27/04 126/381.1 |
| 7,967,003 | B2 * | 6/2011 | Lindsly | A47J 33/00 126/25 R |
| 8,006,686 | B2 * | 8/2011 | Hunt | A47J 36/2477 126/25 R |
| 8,166,870 | B2 * | 5/2012 | Badin | A47J 37/0713 126/25 R |
| 9,655,471 | B2 * | 5/2017 | Zaczyk | A47J 36/06 |
| 2004/0189156 | A1 * | 9/2004 | Pearlman | A47F 10/06 312/137 |
| 2006/0027575 | A1 * | 2/2006 | Lombardo | A47J 27/56 220/4.03 |
| 2006/0201336 | A1 * | 9/2006 | Williams | A47J 36/20 99/403 |
| 2009/0321459 | A1 | 12/2009 | Maczko et al. | |
| 2010/0269709 | A1 * | 10/2010 | Abed | A47J 36/06 99/340 |
| 2015/0104555 | A1 * | 4/2015 | Huttner | A47J 37/101 426/438 |

\* cited by examiner

COOKING SPLATTER PROTECTION DEVICE

CROSS REFERENCE TO RELATED APPLICATIONS

This application claims the priority benefit of U.S. Provisional Patent Application No. 62/184,950, entitled "COOKING SPLATTER PROTECTION DEVICE", filed Jun. 26, 2015.

FIELD OF THE INVENTION

The present invention relates to the cooking arts, and in particular provides protection for the cook and cooking area from material expelled from a cooking pot, pan or other cooking surface.

BACKGROUND OF THE INVENTION

Cooking food has historically been messy. Pots and pans are utilized to contain liquids formed by, or added to, an item being cooked. High temperatures impart high energy to both the food and any associated liquids, and this combination can lead to splattering of the cooking liquid. Back splashes in kitchens are used to make clean up after cooking easier, and to prevent permanent damage to walls in the cooking area.

Screens mounted on handles have been used to reduce and/or eliminate splashing and splattering of cooking liquids. However, screens have the distinct disadvantage that they must be removed in order to fully inspect and/or adjust the item being cooked. Likewise, spices and oils, or any other material, may not be added spontaneously to the cooking implement without first removing the screen. Additionally, screens can trap cooking vapors, which can create condensation, increasing the splatter and compromising the cooking process.

There is a need for an effective splash guard that allows cooking vapors to escape freely and also enables a cook to inspect and/or adjust the item being cooked, as well as enabling the addition or removal of material from the cooking implement, without the added step of removing a splatter screen.

SUMMARY OF THE INVENTION

A cooking splatter guard is provided that includes a surface extending up from a top edge of a cooking implement at an angle. The angle formed between a plane defined by a top edge of the cooking implement and the surface is greater than 90 degrees. The surface forms a friction fit with the top edge of the cooking implement. A lip of the cooking implement formed by the top edge the cooking implement is a same size or slightly smaller than a bottom edge of the cooking splatter guard.

The surface of the cooking splatter guard forms a fit with the top edge of a second cooking implement. A lip of the second cooking implement is formed by a second top edge of the second cooking implement and is slightly larger than the bottom edge of the cooking splatter guard.

The cooking splatter guard may optionally include a frame. The cooking splatter guard may include a handle extending from the frame. The frame may form a closed loop around a top edge of a cooking surface. The frame is adapted to rest on an outer rim of a cooking implement. The cooking implement may be one of a pot, a pan, and a wok.

The frame may form a closed loop around a top edge of a cooking surface. The angle may be between 90 and 150 degrees, may be between 100 and 140 degrees, may be between 110 and 130 degrees, may be between 125 and 135 degrees, and may be approximately 120 degrees.

The surface may include food-grade silicone or aluminum. The surface may include a flat sheet and a plurality of fasteners. The fasteners may be adapted to provide an adjustable size for the cooking splatter guard. The surface may form a friction fit with a top edge of a cooking implement when the adjustable size is selected that is slightly larger than a lip of the cooking implement formed by the top edge.

A cooking splatter guard holder is provided that includes a conical section having an open top and an open bottom. The open top includes a greater diameter than the open bottom. The conical section is adapted to receive the cooking splatter guard. The cooking splatter guard includes a surface extending up from a top edge of a cooking implement at an angle. The angle is formed between a plane defined by the top edge of the cooking implement and the surface and is greater than 90 degrees.

The conical section of the cooking splatter guard holder is adapted to receive the cooking splatter guard when the cooking splatter guard includes a fold extending from a bottom edge of the cooking splatter guard to a top edge of the cooking splatter guard.

The cooking splatter guard holder includes hard plastic. The cooking splatter guard holder optionally includes a tab extending up from the open top. The tab forms a hole adapted to receive a hook for hanging the cooking splatter guard holder with the cooking splatter guard.

DETAILED DESCRIPTION

An exemplary device according to the present invention may shield a stovetop and a chef from being soiled by oils and cooking liquids that splatter when preparing food in a cooking utensil such as a pan, griddle or pot.

In the present invention, the skirt-shaped shield rises from its base at an obtuse angle relative to the cooking utensil, such that the opening at the top of the shield is broader than its base. This design element serves two ends. First, compared to a shield that stands at a right angle to the cooking surface, it provides the chef freer access to the cooking surface, allowing easy manipulation of the cooking food. Second, it allows steam and vapor to escape more freely, thereby avoiding the condensation that can increase splatter and also compromise the cooking process.

In exemplary embodiments, the shield element is foldable, allowing it to be stored in a space-efficient manner and to assume its cooking shape without need for complex assembly.

Figure 1A:
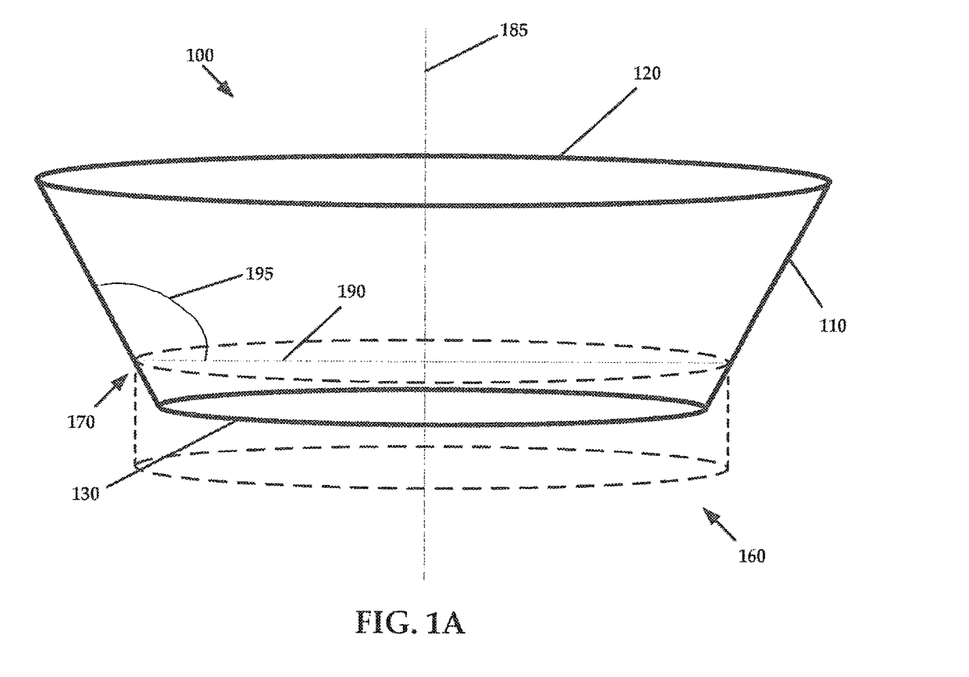
FIG. 1A is an isometric view of an exemplary embodiment of the present invention.

FIG. 1A illustrates an exemplary embodiment of splatter guard 100 according to the present invention in combination with cooking implement 160 (shown in dashed lines). Cooking implement 160 may be a pan, or any other cooking implement, having a bottom surface, a sidewall and a central axis 185. Splatter guard 100 includes a conical surface 110 having a top edge 120 and a bottom edge 130. Bottom edge 130 forms a circle of a diameter that approximates the diameter of a top edge of cooking implement 160. Top edge 120 forms a circle of a diameter larger than the diameter of the circle formed by bottom edge 130. Conical surface 110 extends up from a top edge, defined by line 190, of cooking implement 160 at an angle 195. Angle 195, formed between a plane defined by a top edge of cooking implement 160 and splatter guard 100 is greater than 90 degrees.

Splatter guard 100 illustrates a splatter guard for a round pan, but alternative exemplary embodiments may be provided for square, rectangular, or any other appropriately shaped cooking surface. Therefore, in alternative exemplary embodiments, one or both of bottom edge 130 and top edge 120 may not be a circle.

Figure 1B:
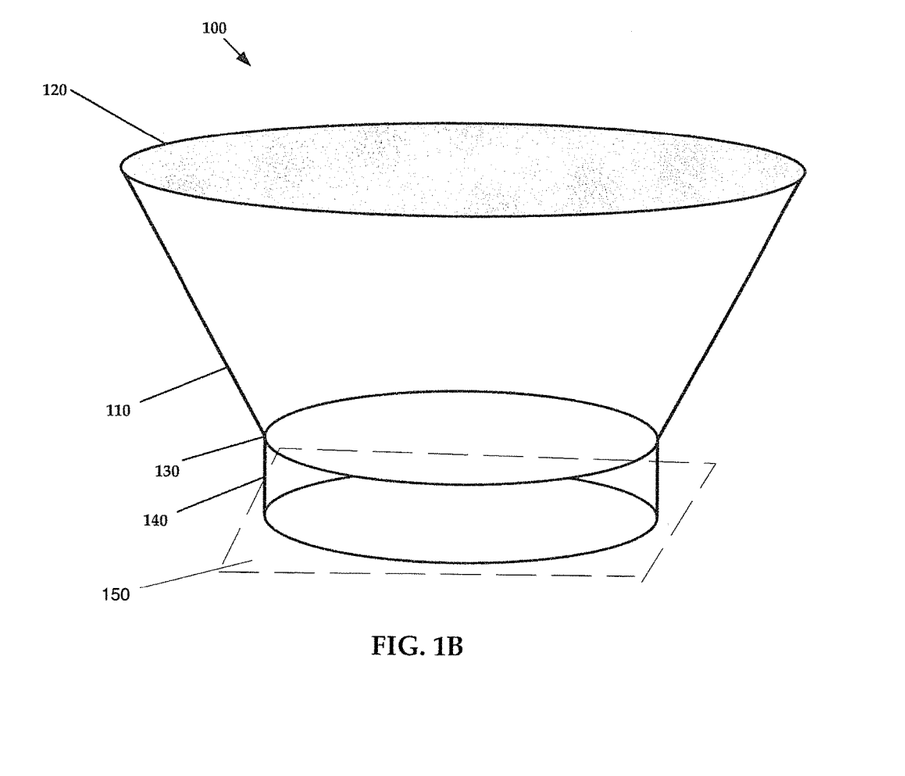
FIG. 1B is an isometric view of another exemplary embodiment of the present invention including a frame.

FIG. 1B illustrates an exemplary embodiment of splatter guard 100 according to the present invention including a frame, described herein as a flange. Splatter guard 100 includes a conical surface 110 having a top edge 120 and a bottom edge 130. Bottom edge 130 forms a circle of a diameter that approximates the diameter of a top edge of the cooking surface. Top edge 120 forms a circle of a diameter larger than the diameter of the circle formed by bottom edge 130.

Splatter guard 100 illustrates a splatter guard for a round pan, but alternative exemplary embodiments may be provided for square, rectangular, or any other appropriately shaped cooking surface. Therefore, in alternative exemplary embodiments, one or both of bottom edge 130 and top edge 120 may not be a circle.

Splatter guard 100 includes flange 140 extending downwards from bottom edge 130. Flange 140 may be optionally provided, and/or may be removable, and may provide a surface enabling a friction fit with an interior top edge surface of the cooking implement, for instance a pan. Some or all of the exterior of the surface of flange 140 may contact the interior top surface of the cooking implement 160.

Figure 2:
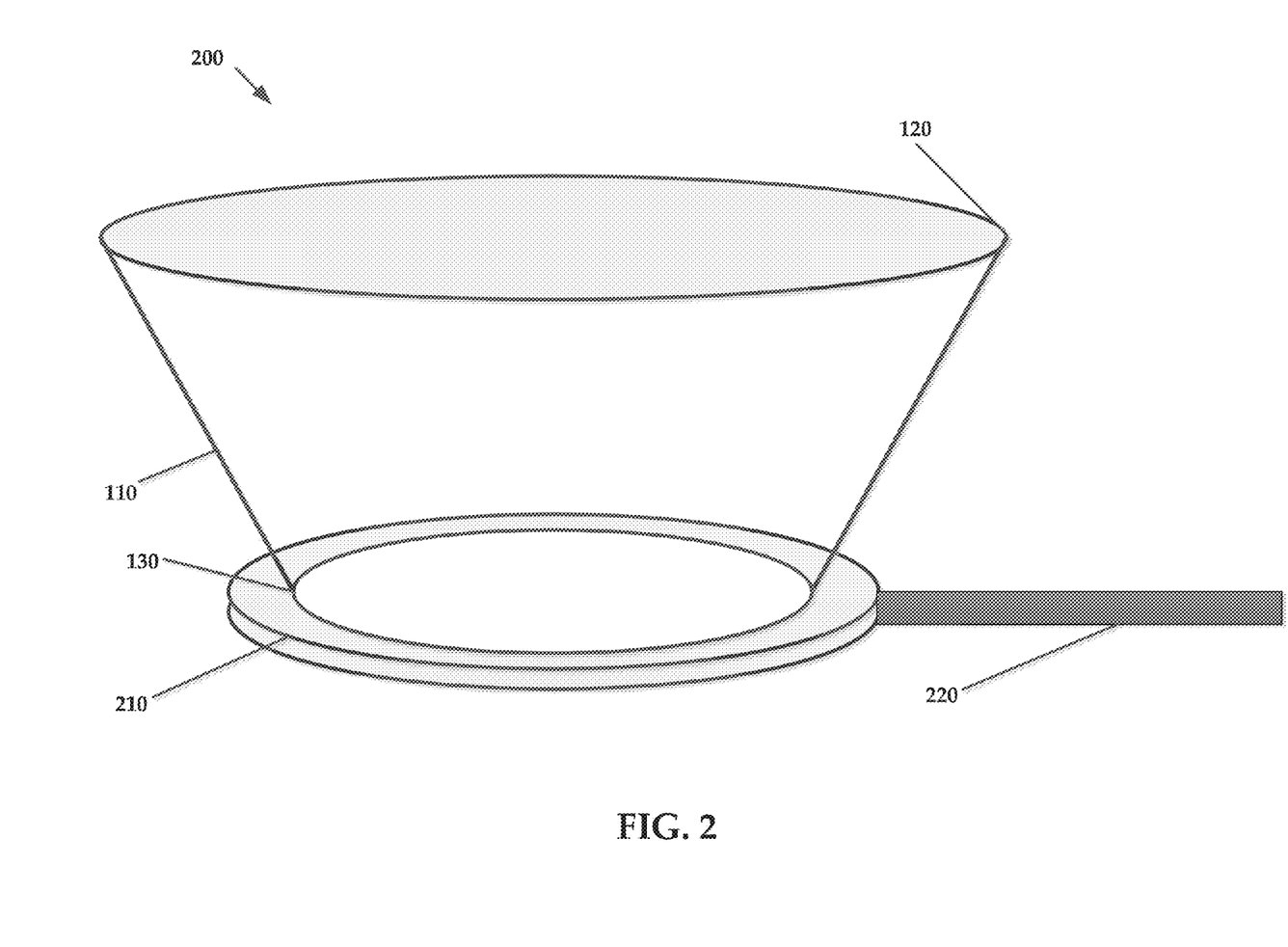
FIG. 2 is an isometric view of another exemplary embodiment of the present invention including a handle.

FIG. 2 illustrates splatter guard 200 which includes frame 210 and handle 220 attached to conical surface 110 for use with a cooking surface 150. Splatter guard 200 is illustrated without a flange, however a flange may be provided below frame 210 to provide a friction fit with a cooking implement, and/or to provide a positioning function for splatter guard 200 with respect to the cooking implement. Additionally or alternatively, a flange may be provided above frame 210 and below bottom edge 130. Frame 210 and handle 220 may be detachable from splatter guard 200. In a disposable exemplary embodiment made of aluminum, the skirt, the flange, and the handle may come preassembled and may not be detachable.

In exemplary embodiments, frame 210 may be fixedly or detachably connected to bottom edge 130. A detachable connection may be accomplished by any appropriate method, for example a groove, a friction fit, and/or a magnet. Frame 210 may include a downward extending flange. The flange may be of a diameter greater than the diameter of the target cooking surface to enable a positioning function to be performed by the flange. The frame 210 may include handle 220 adapted to provide easy control of frame 210 and splatter guard 200 attached thereto. Handle 220 may be detachable from frame 210.

Figure 3:
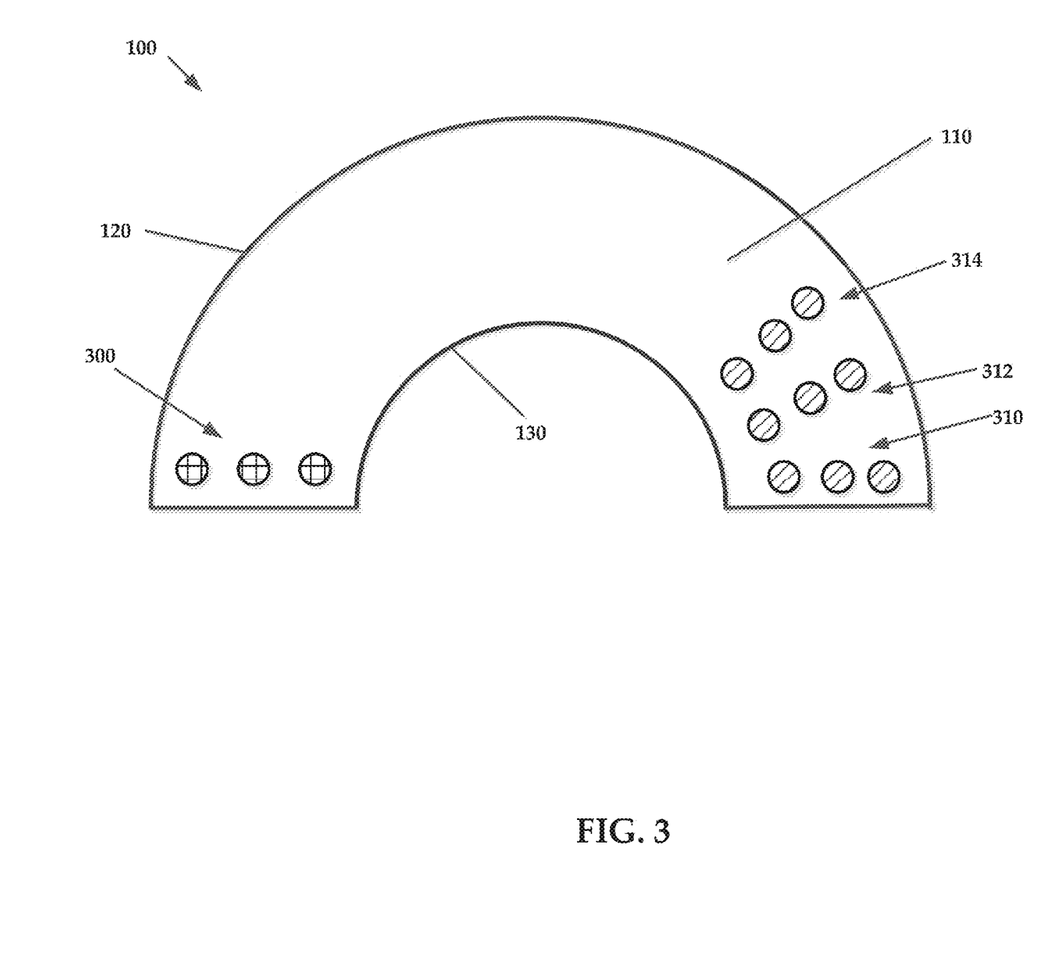
FIG. 3 is a plan view of another exemplary embodiment of the present invention in a disassembled state.

FIG. 3 illustrates splatter guard 100 in an optionally deconstructed condition, which may be provided for shipping of the original splatter guard, and/or for cleaning and/or storage by a user of splatter guard 100. Splatter guard 100 may be deconstructed by detaching coupling projections 300 from one of coupling receivers 310, 312 and 314. Coupling projections may be arranged on a line extending from top edge 120 to bottom edge 130. Alternatively, coupling projections 300 and coupling receivers 310, 312 and 314 may be arranged in alternative positions to provide a variety of sizes and shapes for splatter guard 100 for use with a variety of cooking implements. Coupling projections 300 and coupling receivers 310, 312 and 314 may be any appropriate attachment mechanism, including holes paired with pins.

Figure 4:
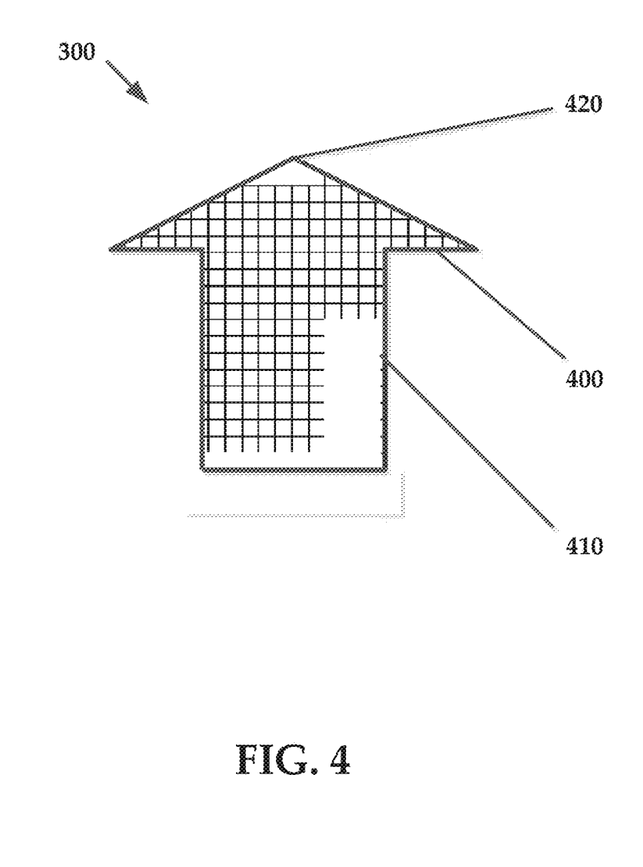
FIG. 4 is a side view of an exemplary embodiment of a fastening element according to the present invention.

FIG. 4 illustrates a side view of one coupling projection 300. Coupling projection 300 may be composed of food-grade silicone, and may be flexible. Coupling projection may include tip 420, locking projection 400 and post 410. Post 410 may be fixedly attached to a surface of the splatter guard, and/or may be composed of the same material as the splatter guard. Post 410 may be attached to the splatter guard opposite tip 420. Post 410 may have a size and shape to match a coupling receiver, for example coupling receivers 310, 312 and 314. In particular, post 410 may have a circular cross section, and coupling receivers 310, 312 and 314 may be circular holes. Coupling projection 300 may be adapted to be pushed through a coupling receiver by pressure provided manually. Locking projection 400 may be deformed during the coupling process by folding down away from tip 420 while passing through a coupling receiver, and may return to the shape shown in FIG. 4 after passing through the coupling receiver. In this manner, locking projection 400 may prevent coupling projection 300 from sliding back through the coupling receiver. Deconstructing the splatter guard may be accomplished by exerting sufficient manual force on coupling projection 300 that locking projection 400 deforms to pass through the coupling receiver.

Figure 5A:
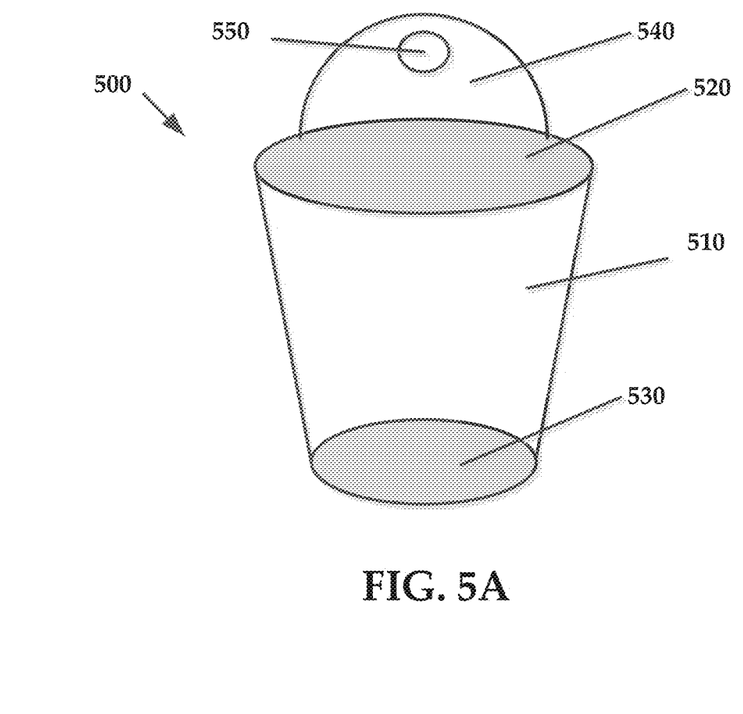
FIG. 5A is an isometric view of an exemplary embodiment of a holder for a cooking splatter guard according to the present invention.

FIG. 5A is an isometric view of an exemplary embodiment of holder 500 for a cooking splatter guard according to the present invention. Holder 500 includes a conical surface 510 forming a top opening 520 and a bottom opening 530. Tab 540 may optionally be provided along a top edge of top opening 520, or alternatively in another location. Tab 540 may form hold 550, which may be adapted to receive a hook for hanging a cooking splatter guard being held by holder 500.

Figure 5B:
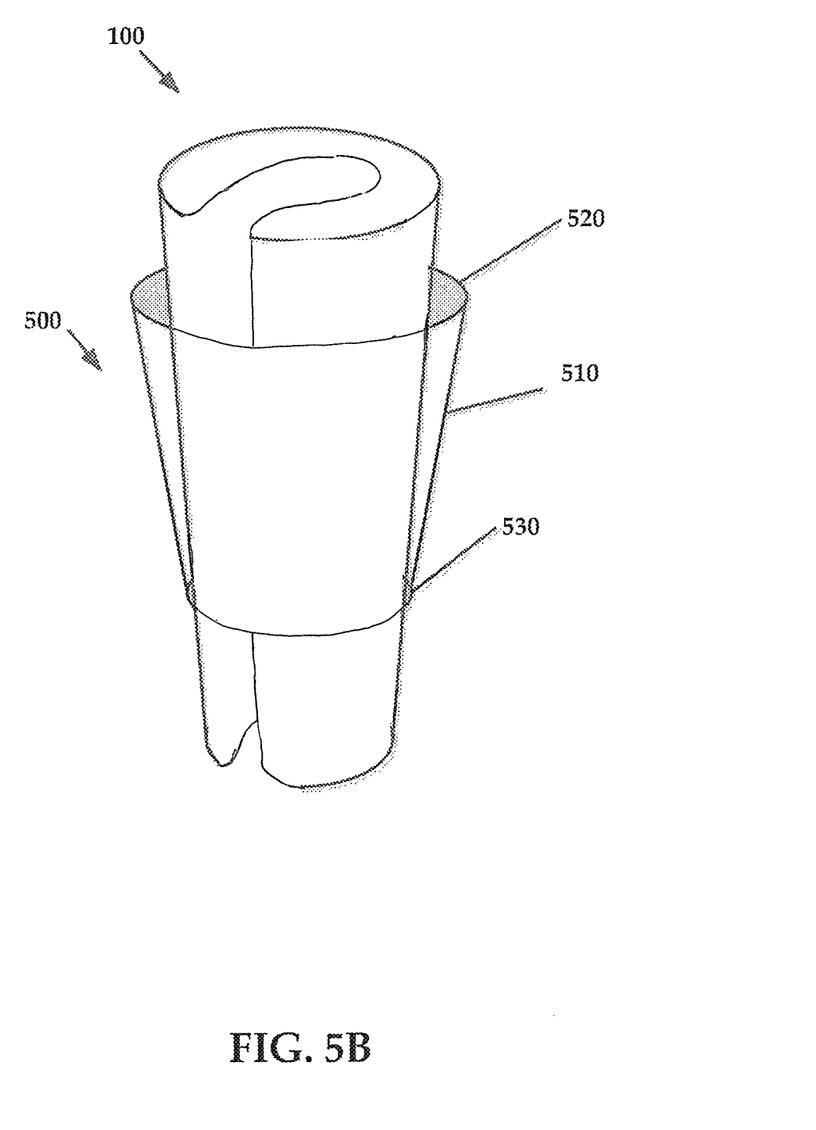
FIG. 5B is an isometric view of the exemplary embodiment of the holder shown in FIG. 5A holding a cooking splatter guard according to the present invention.

FIG. 5B is an isometric view of the exemplary embodiment of holder 500 shown in FIG. 5A holding cooking splatter guard 100 according to the present invention. Cooking splatter guard 100 may be folded along a length from top to bottom (not shown), in order to position cooking splatter guard 100 in holder 500. In other words, the conical section of holder 500 may form a smaller conical section than that formed by cooking splatter guard 100, and folding cooking splatter guard 100 may be required to fit cooking splatter guard 100 in holder 500. In this manner, holder 500 may tightly hold cooking splatter guard 100 and may also reduce the space occupied by cooking splatter guard 100. The reduced spatial footprint provided by holder 500 to cooking splatter guard 100 may be advantageous for reducing shelf space requirements for a seller, as well as storage requirements by a user.

Holder 500 in FIG. 5B may include a tab for displaying holder 500 and cooking splatter guard 100, but this is not shown in FIG. 5B for the sake of clarity.

The sizes and angles shown in FIGS. 1A-5B are not to scale and are for illustration purposes only.

The device is a splatter guard that rests atop a cooking utensil and is comprised of a flexible or bendable, collar-shaped (or skirt-shaped) shield that is optionally supported by a rigid frame (with a handle).

The device may have two elements, a shield and a frame with a handle to hold the shield.

The shield has a collar-like (or skirt like) shape whose cross section at the base approximates the inner contour of the frame element, and whose surface extends upward from the base at an obtuse angle.

The shield is made of heat-resistant, foldable material, for example food-grade silicone or aluminum foil. The shield is delivered to the user (i.e. packaged) in the folded position and is opened prior to usage. After usage, the shield may be refolded for disposal or storage.

The frame with the handle has two functions. It holds and stabilizes the shield in place atop the cooking surface. When used atop a pan, the handle also allows the shield and the pan to be held simultaneously with a single hand. This is useful for sautéing and similar techniques that require the cooking surface to be moved.

The shape of the frame may approximate the shape of the rim of the cooking vessel for which it is intended. A frame intended for a round pan should generally be round; for a square pan, square; for a rectangular griddle, rectangular; etc.

In exemplary embodiments, the device may consist of the shield without a frame. In this embodiment, the exterior contour of the bottom of the shield create a form fit with the interior contour of the cooking device. In this embodiment, the rim of the cooking device serves as de facto frame for the shield.

In alternative exemplary embodiments, a shield and a frame are provided. The frame has a downward-extending flange along its outside edge to prevent it from sliding off the cooking pan. The flange also allows a single device to be used on any utensil whose rim may be covered by the top of the frame while being contained within the inside surface of the flange. In this manner, the range of the splatter guard's usefulness may be expanded.

The inner contours of the frame hold the shield, such that the inner contours of the frame describe and match the shape of the shield at its base.

In additional alternative exemplary embodiments, a handle is not attached to the splatter guard, and a frame without a handle is sufficient. In still further alternative exemplary embodiments, a disposable shield with or without a handle, and with or without a flange, is used. In these alternatives, the frame element is used for support and the shield folds and has an obtuse angle when in the usage position.

In operation, the device is used by placing it atop a cooking utensil by means of either the handle or the edge of the shield. Once atop the cooking utensil, the device works by halting the splattering oil and cooking liquids before they reach the stove top or the chef. The device also has a secondary use that is related but distinct from halting splatter: in cases when a cooking device is filled to near capacity, or beyond capacity, the skirt wall prevents food from toppling over the edge of the cooking device, as might happen when sautéing leafy greens. After usage, the shield element of the device may be folded and disposed of, or cleaned and folded for storage and subsequent reuse.

Three elements make this device both unique and uniquely well-suited to its function:

1) the collar that rises at an obtuse angle.

2) the material allows the shield to be easily folded and unfolded to allow for easy set-up as well as space-efficient packaging, storage, and disposal.

3) in some exemplary embodiments, a rigid frame is provided to hold the shield and stabilize the shield above the cooking vessel.

Optionally, a flange is provided to assist in placement and positioning during the cooking process.

In exemplary embodiments, the shield intended for a medium size pan may be about 7 inches high, measured from the top of the frame to the rim of the shield along the surface of the shield (as opposed to vertically). A shield intended for a smaller pan may have a shorter wall, while a shield intended for a larger pan (or a griddle) may have a taller wall.

The heights of various cooking splatter guards according to the present invention may vary from 7 inches by plus or minus 3 inches. This range of between 4 and 10 inches may capture the majority of use cases.

The angles of various cooking splatter guards according to the present invention may vary from 120 degrees by plus or minus 20 degrees. This range of between 100 and 140 degrees may capture the majority of use cases.

The invention claimed is:

1. A method of shielding splatters during cooking, comprising:
   providing a cooking splatter guard folded for storage in a holder;
   providing a holder for receiving a folded said cooking splatter guard;
   the cooking splatter guard comprising a wall having a bottom edge and a top edge and an opening extending through the bottom and top edges, the wall extending at an unfolded angle between a bottom portion having a first diameter and a top portion having a second diameter larger than the first diameter, and wherein the wall comprises heat-resistant, foldable silicone, the unfolded angle being an obtuse angle;
   the folded cooking splatter guard having a fold that extends from a top portion of the cooking splatter guard to a bottom portion of said cooking splatter guard;
   the holder further comprises, a supporting tab member extending from a holder top opening, and a holder bottom opening opposite said holder top opening, said holder top opening having a holder first dimension;
   said holder bottom opening having a second holder dimension that is smaller than said holder first dimension, and said bottom edge of said wall extending fully through said holder;
   removing said cooking splatter guard from said holder;
   unfolding said cooking splatter guard;
   positioning a cooking splatter guard at least partially within a cooking implement having a top edge such that the bottom edge of the cooking spatter guard is inserted into the cooking implement;

contacting a midportion of said wall between said top edge and said bottom edge to said lip edge of said cooking implement; and said wall is between 4 inches and 10 inches as measured between the bottom portion and the top portion along the surface of the wall.

2. The method of claim 1, wherein the unfolded angle is between 100 degrees and 140 degrees.

3. The method of claim 2, wherein the unfolded angle is between 110 and 130 degrees.

4. The method of claim 3, wherein the unfolded angle is between 115 and 125 degrees.

5. The method of claim 1, wherein said step of positioning the cooking splatter guard further comprises forming a fat between the bottom edge of the cooking splatter guard and a top edge of the cooking implement.

6. The method of claim 5, wherein the fit is a friction fit.

7. The method of claim 1, wherein positioning the cooking splatter guard comprises forming a fit between an exterior contour of the bottom edge of the cooking splatter guard and an interior contour of the cooking implement.

8. The method of claim 1, wherein the bottom edge comprises a circle.

9. The method of claim 1, wherein the bottom edge forms a square.

10. The method of claim 1, wherein the cooking splatter guard further comprises a handle, wherein the method further comprises holding the handle and the cooking implement simultaneously.

11. The method of claim 1, wherein the cooking splatter guard comprises a frame coupled to the wall.

12. The method of claim 1, wherein the wall comprises a sheet and at least one fastener configured to provide an adjustable size for the cooking splatter guard.

* * * * *